United States Patent
Bailey

[15] 3,646,510
[45] Feb. 29, 1972

[54] CIRCUIT FOR SIGNALING ALTERNATION ERROR IN DETECTORS FOR RAILWAY VEHICLE CONTROL SYSTEM

[72] Inventor: Donald J. Bailey, Palatine, Ill.
[73] Assignee: Mangood Corporation, Grayslake, Ill.
[22] Filed: Feb. 27, 1970
[21] Appl. No.: 15,142

[52] U.S. Cl. ................................. 340/23, 246/77
[51] Int. Cl. ....................................... G08g 1/015
[58] Field of Search .................... 340/23, 31, 38; 246/169 R, 246/169 D, 77, 122, 247

[56] References Cited

UNITED STATES PATENTS 3,144,225  8/1964  Suerkemper et al. .................. 246/77
3,169,734  2/1965  Fryba ................................... 246/77

Primary Examiner—Kathleen H. Claffy
Assistant Examiner—Thomas L. Kundert
Attorney—Davis, Lucas, Brewer & Brugman

[57] ABSTRACT

In a railway vehicle control system having a pair of axle detectors spaced along the line of movement of a trail, a distance less than the closest axle-to-axle spacing in standard railway vehicles, a detector-for-detector interrogation system which activates an error signal if either is repeated without alternation with the other. An error signal output circuit is connected to receive signals through two control gates connected to input circuits activated by the two axle detectors. A control circuit unblocks one of the control gates in response to repeat actuation of either axle detector and places an error signal in the output circuit.

8 Claims, 4 Drawing Figures (NORMAL STATE AFTER ACTUATION OF DETECTOR A)

PATENTED FEB 29 1972    3,646,510

(NORMAL STATE AFTER ACTUATION OF DETECTOR A)

(NORMAL STATE AFTER ACTUATION OF DETECTOR B)

INVENTOR.
Donald J. Bailey
BY
Davis, Lucas, Brewer & Brugman
ATTORNEYS

CIRCUIT FOR SIGNALING ALTERNATION ERROR IN DETECTORS FOR RAILWAY VEHICLE CONTROL SYSTEM

CROSS-REFERENCES TO RELATED APPLICATIONS

Reference is made to the following related patent applications, assigned to the same assignee, filed concurrently with this application: Tonies application Ser. No. 15,066, filed Feb. 27, 1970, on "Method and Apparatus for Generating a Read-out Signal Synchronized with Railway Vehicle Movement;" Tonies and Teasdale application Ser. No. 15,067, filed Feb. 27, 1970, on "Method and Apparatus Utilizing Unique CDAB Sequence for Detecting Synchronization Error in Railway Vehicle Read-out Signal;" Tonies and Teasdale application Ser. No. 15,068, filed Feb. 27, 1970, on "Method and Apparatus Utilizing Unique CDAB Sequence for Correcting Synchronization Error in Railway Vehicle Read-out Signal;" Tonies application Ser. No. 15,140, filed Feb. 27, 1970, on "Method and Apparatus for Identifying Engines in a Train of Railway Vehicles;" Tonies application Ser. No. 15,141, filed Feb. 27, 1970, on "Sequence Detector for Railway Vehicle Control System."

BACKGROUND OF THE INVENTION

The field of invention includes weighing of railroad vehicles, while coupled and in motion, Patent Office Classification No. 177-1 as well as detecting and recording other information about railroad cars and engines.

Identification of railroad cars while coupled and in motion is complicated by the fact that, although axle and coupling spacings are standardized within known limits, and with rare exceptions a car or engine will have either four, six or eight axles of standard spacings, these are generally mixed at random in a train. This complicates the problem of identifying vehicles simply by counting their axle assemblies which of course are the only elements of a railway car or engine normally in contact with the rails.

In the vehicle identification systems described in the above copending applications, a readout signal is synchronized with a particular axle of each vehicle reaching a certain axle detector location or series of locations. In motion weighing, for example, the weight readout is synchronized with the last axle of the vehicle and this requires computerlike intelligence, in a train of mixed four-, six- and eight-axle cars and engines, to first determine how many axles each vehicle has, and then to identify the last one of each. The basis for such counting and identification is to provide means for counting axles beginning with a one-count for the first axle, followed by a two-count for the second axle, and so on. Uniquely spaced axle detectors, provide the information needed to determine which is the first, second, etc., axle of each vehicle. These detectors are spaced less than the minimum distance between adjacent axles on standard railway vehicles (about 4 feet 6 inches), and therefore one characteristic which may be used to detect counting error is that adjacent detectors are actuated alternately, never repeating one without intervening the other. In other words, if detectors identified as A and B are 3 feet apart along a railway, the normal sequence, as between these two detectors will always be A B A B A B... . If there is a repeat such as A A or B B, this means something like a faulty switch or a broken wheel flange has caused a miscount, or a bounce or vibration has caused the system to "stutter" and duplicate a count. Either type of error will throw the system out of synchronization. It is essential to determine this as soon as it occurs.

Thus, by checking alternation patterns between adjacent axle detectors, a very simple and effective way is provided for checking synchronization of the axle count. This is triply effective where, as in some of the applications referred to, four axle detectors are intervened by three separate detector-for-detector comparators.

SUMMARY OF THE INVENTION

A principal object of the present invention is to provide, in a railway vehicle control system having a pair of axle detectors spaced along the line of movement of a train, a detector-for-detector interrogation circuit for monitoring the alternation sequence of a pair of axle detectors.

Another object is to provide such an interrogation system, for a pair of axle detectors identified A and B in which an alternation error signal will be activated in response to an "A A" or "B B" repeat, but will not activate an error signal in response to an "A B A B A B" alternation sequence.

A specific object is to provide such an interrogation system including a pair of input signal lines connecting axle detector switches through gates to an error signal output line, and control means alternately blocking the gates under normal alternation sequence to block the passage of a signal from either detector to the output line, and unblocking the gates under a repeat sequence to place an error signal in the output line.

Other objects and advantages will be apparent from the following description taken in connection with the drawings in which.

Like parts are referred to by like reference characters throughout the figures of the drawings.

This invention is particularly applicable in single or multidraft weighing of railway vehicles in which individual axle or truck assemblies, or an entire car or engine, are weighed and suitably totalized and printed out or displayed in response to a readout signal which coincides with weighing of the last axle or truck, or of the entire vehicle. The railway vehicles may be coupled or uncoupled and in motion, or stationary on a weight scale.

Figure 3:
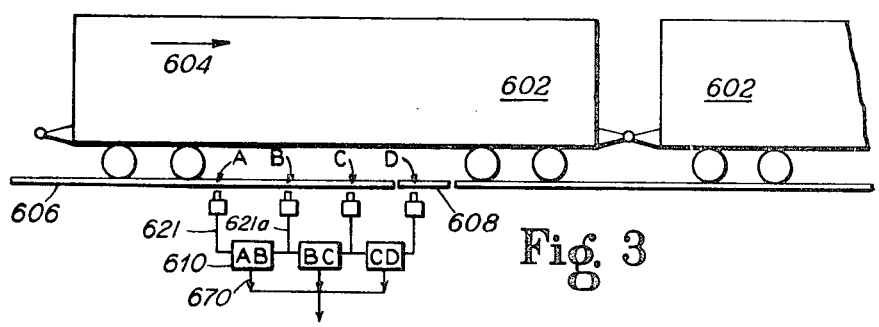
FIG. 3 is an environmental view showing how the circuit of FIGS. 1 and 2 may be employed in a system for weighing railway vehicles while coupled and in motion.

Referring now more particularly to the drawings, FIG. 3 shows an environmental view in which railway cars 602 move in the direction of the arrow 604 along a track 606 having a weigh rail section 608. Axle detectors A, B, C and D are spaced along the line of movement of the train, generally less than 4 feet 6 inches apart where the vehicles are standard railway cars or engines.

An A and B count comparator 610 has input signal lines 621, 621a respectively from actuators A and B and an error signal output line 670.

Count comparators are also shown between detectors B and C and detectors C and D. Because they may be identical with comparator 610, only the latter will be described in detail.

Each axle detector may be any suitable means for detecting the arrival, presence, or passage of an axle assembly and may be responsive to magnetic, inductive, capacitive, electrical or mechanical characteristics of an axle or wheel. In the present case, each of the axle detectors A and B includes a plunger 618 so disposed along the rail 606 that it will be depressed down into the casing 620 by the wheel flange of an axle assembly passing over it.

Each detector has associated with it a special control circuit which activates first one signal input line and then another.

Detector A, when actuated, places a signal on line 621, leading to pulse generator 623. This places a pulse in an input circuit including input line 648 and a branch line 625. This pulse is identified T-1 in FIG. 4 where it is shown as having a duration of 0.001 second. The time delay circuit 627 places a similar delayed pulse T-2 in line 650 which sets binary gate 656. T-2 may lag T-1 by 0.001 second as shown in FIG. 4.

Figure 4:
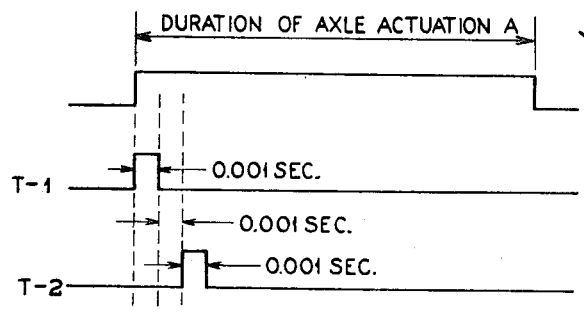
FIG. 4 is a pulse/time diagram showing one example of input signals for operating this system.

As clearly shown in FIG. 4, pulses T-1 and T-2 are independent of the length of time which detector A remains actuated by a car or engine wheel. Signal T-1 completes before T-2.

Thus, a signal in line 621 generates a first pulse T-1 in first signal input line 648 and a second, delayed pulse T-2 in second signal input line 650. And, regardless of the length of time which axle detector A is held actuated by an axle assembly, pulses T-1 and T-2 will occur in the sequence described.

Referring now to detector B, when actuated, it places a signal in line 621a leading to pulse generator 649. This places a pulse in an input circuit including input line 652 and branch line 651. The pulse in lines 652 and 651 may be similar to pulse T-1 described above. The time delay circuit 653 responds to the pulse in line 651 and places a delayed pulse similar to T-2 in line 654.

Thus, actuation of axle detector A places a first pulse T-1 in first input signal line 649, and a delayed, second pulse T-2 in second input signal line 650. Similarly, actuation of axle detector B places a first pulse T-1 in first input signal line 652, and a delayed, second pulse T-2 in second input signal line 654.

It will be appreciated that any circuit means which places separate, sequential signals in first and second input signal lines, in response to activation of detector A or B, may be the equivalent of the input circuits shown.

The A and B count comparator 610 comprises a bistable binary gate 656 and first and second control gates 658 and 660.

Figure 1:
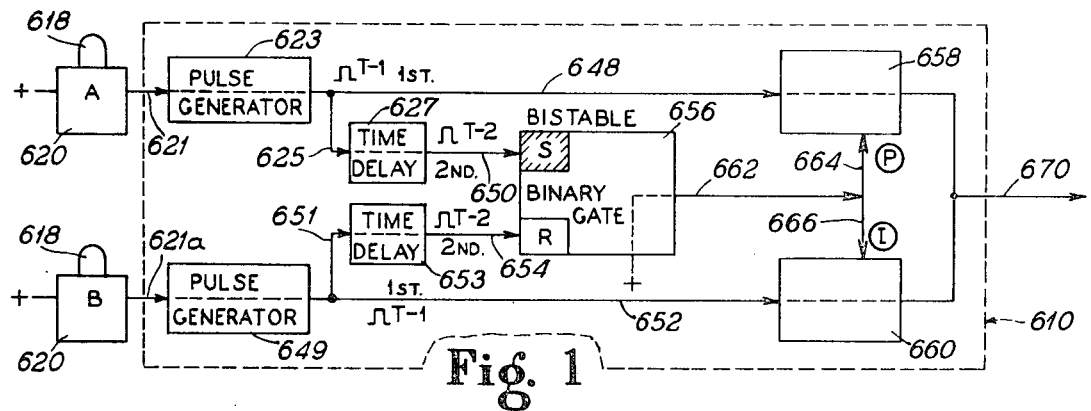
FIG. 1 is a schematic diagram of one circuit or system illustrating a preferred form of the present invention and being shown in one operative condition.

When binary gate 656 is set as shown in FIG. 1, a signal will be placed in gate control line 662 and branch control lines 664, 666. As indicated by the letters "P" and "I" a signal in lines 662, 664 and 666 will render gate 658 permissive and gate 660 inhibiting. This means that a signal in first signal input line 648 will pass through gate 658 into error signal output line or circuit 670; and a signal in first signal input line 652 will be inhibited or blocked in gate 660.

FIG. 1 shows the condition of the count comparator immediately after a normal actuation of detector A. Binary gate 656 is set, first control gate 658 is permissive, and second control gate 660 is inhibited (blocked).

Figure 2:
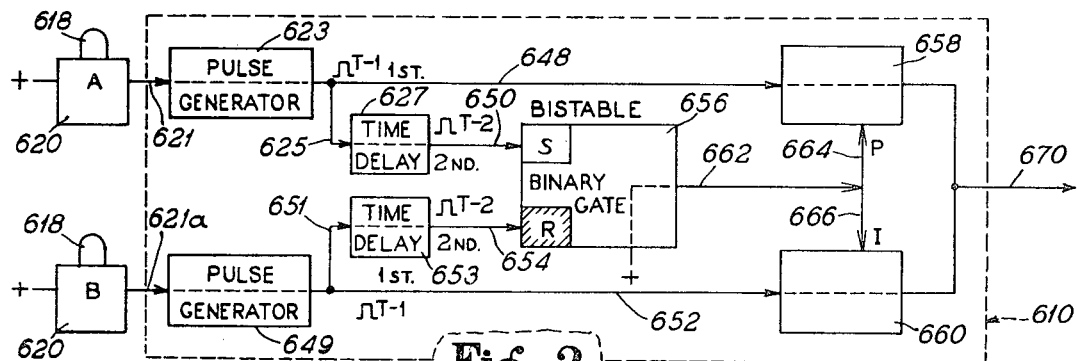
FIG. 2 is a view similar to FIG. 1 showing an opposite operative condition.

FIG. 2 is comparable to FIG. 1, showing the condition of the circuit when reset. Line 662 will not carry a signal and gates 658 and 660 will be returned to their normal blocked and permissive states respectively.

Gates 656, 658 and 660 remain in one state or another until a definite signal in line 650 or 654 reverses them.

Use and operation will now be described briefly.

FIG. 1 is the state of the circuit immediately after normal actuation of detector A. If another actuation of detector A is placed on line 621, before detector B is actuated, it will place a first pulse T-1 in first input signal line 648, and a delayed pulse T-2 in second input signal line 650. The signal pulse T-1 will pass through permissive gate 658 and into error signal output line 670, thereby actuating an alarm or printing an error on a suitable format, or the like. On the other hand, if, in the condition of FIG. 1, B is actuated, this will place a signal T-1 in first input signal line 652 and a delayed signal T-2 in second input signal line 654. The first signal or pulse T-1, cannot pass through gate 660 because it is blocked. The second signal or pulse T-2, resets binary gate 656, conditioning the circuit for the next actuation of axle detector A and extinguishing the signal in control gate line 662 and converting to the state shown in FIG. 2, without placing an error signal in line 670.

FIG. 2 is the state of the circuit immediately after normal actuation of detector B. Binary gate 656 is reset (off). There is no signal in lines 662, 664 and 666, thereby returning gates 658 and 660 to their normal blocked and permissive states respectively.

Still referring to FIG. 2, if axle detector B is repeated, without an intervening actuation of detector A, the first pulse T-1 will pass through permissive gate 660 and place an error signal in line 670.

On the other hand, if the condition of FIG. 2 is succeeded by actuation of detector A, the first pulse T-1 in line 648 will be unable to pass through gate 658 because the latter is blocked; the second pulse T-2 in line 650 will set binary gate 656 and the resulting activation in lines 662, 664 and 666 will return the circuit to the state of FIG. 1 without generating an error signal in line 670.

In other words, actuation of detector B when the circuit is as shown in FIG. 1 results in no error signal. Actuation of detector A, constituting a repeat of A, would result in an error signal.

Similarly, actuation of detector A when the circuit is as shown in FIG. 2, results in no error signal. Actuation of detector B, constituting a repeat of B, would result in an error signal. of FIG. 4, namely the normal state after actuation of detector A, contacts 672 and 680 are closed while contacts 696 are open. Conversely, for the normal state after actuation of detector B, contacts 674 and 680 would be open and contacts 696 would be closed.

Use and operation will now be described briefly in connection with FIGS. 1 and 2.

FIG. 1 is the state of the components immediately after normal actuation of detector A. If another actuation of detector A is placed on the circuit it will activate line 648, the signal will pass through permissive gate 658 and into error signal output line 670, thereby actuating an alarm or printing an error on a suitable format, or the like. On the other hand, if, in the condition of FIG. 1, B is actuated, this will first place a signal in line 652 which will be ineffective because control gate 660 is blocked. At the subsequent instant the signal in line 654 resets binary gate 656, extinguishing the signal in control gate line 662 and converting to the state shown in FIG. 2, without placing an error signal in line 670.

In other words, actuation of detector B, when the circuit is as shown in FIG. 1, results in no error signal. Actuation of detector A would result in an error signal.

Similarly, referring to FIG. 2, actuation of signal B (thereby producing a repeat "B B" sequence) would result in an error signal. Actuation of detector A would not.

I claim as my invention:

1. In a railway vehicle control system having a pair of axle detectors spaced along the line of movement of a train, detector-for-detector interrogation apparatus effective to activate an error signal in response to nonalternating repeated actuation of said axle detectors comprising:

an error signal output circuit;

an input circuit associated with each of said axle detectors;

means responsive to actuation of each of said axle detectors to generate separate first and second sequential input signals in the input circuit associated therewith;

a pair of gates controlling communication between said input circuits and said output circuit; and gate control means utilizing said second input signals to permit passage of one of said first input signals through one of said gates into said error signal output circuit in response to repeated actuation of either of said detectors without intervening actuation of the other detector.

2. In a railway vehicle control system, detector-for-detector interrogation apparatus according to claim 1 in which said axle detectors are spaced apart less than the closest adjacent axles on standard railway vehicles.

3. In a railway vehicle control system having a pair of axle detectors spaced along the line of movement of a train, detector-for-detector interrogation apparatus effective to activate an error signal in response to nonalternating repeated actuation of said axle detectors comprising:

an error signal output circuit;

an input circuit associated with each of said axle detectors;

means responsive to actuation of each of said axle detectors to generate separate first and second sequential input signals in the input circuit associated therewith;

a pair of gates controlling communication between said input circuits and said output circuit;

and gate control means utilizing said second input signals, to block passage of said first input signals through said gates into said error signal output circuit in response to alternate nonrepeat actuation of said axle detectors, and to permit passage of one of said first input signals through one of said gates into said error signal output circuit in response to repeated actuation of either of said detectors without intervening actuation of the other detector.

4. In a railway vehicle control system having a pair of axle detectors spaced along the line of movement of a train, detector-for-detector interrogation apparatus effective to activate an error signal in response to nonalternating repeated actuation of said detectors comprising:

an error signal output line;

a first signal input line connecting each of said detectors to said output line, each first input signal line being energizable by its corresponding detector;

a second signal input line associated with each of said first signal input lines;

a pair of gates connecting said first signal input lines to said output line;

means responsive to actuation of each of said detectors to generate first and second input signals in timed sequence in the corresponding first and second signal input lines respectively;

gate control means connected between said second signal input lines and said gates;

said gate control means being effective, in response to alternation of signals in said second signal input lines, to block said gates during the presence of signals in said first signal input lines, thereby to prevent activation of error signals in said output lines upon alternating, nonrepeat, actuation of said detectors; and said gate control means further being effective, in response to repeat of signals in the second signal input line associated with one detector without an intervening signal in the second signal input line associated with the other detector, to unblock the gate corresponding to said one detector during the presence of a signal in the first signal input line for said one detector, thereby to activate an error signal in said output line upon repeated actuation of said one detector without intervening actuation of said other detector.

5. In a railway vehicle control system having a pair of axle detectors spaced along the line of movement of a train, detector-for-detector interrogation apparatus effective to activate an error signal in response to nonalternating repeated actuation of said axle detectors comprising:

an error signal output line;

first and second signal input lines for each of said detectors energizable in timed sequence in response to actuation of the corresponding detector;

a pair of control gates connecting said first input signal lines to said output line;

a binary gate connected between said second signal input lines and said control gates;

said binary gate being effective in response to alternate actuation of said detectors to alternately block said control gates concurrently with energization of said first signal input lines, thereby to prevent activation of an error signal in said output line; and said binary gate further being effective, in response to repeat actuation of either detector without an intervening actuation of the other detector, to unblock a control gate concurrently with energization of a corresponding first signal input line, thereby to activate an error signal in said output line.

6. In a railway vehicle control system, detector-for-detector interrogation apparatus according to claim 5 in which each second signal input line is connected to the corresponding first signal input line through time delay means, whereby said second signal input line is energized in response to energization of said corresponding first signal input line after a predetermined time delay.

7. In a railway vehicle control system, a detector-for-detector interrogation apparatus according to claim 5 in which each control gate is stable in either blocked or unblocked state as determined by the binary gate.

8. In a railway vehicle control system having a pair of axle detectors spaced along the line of movement of a train, detector-for-detector interrogation apparatus effective to activate an error signal in response to nonalternating repeated actuation of said axle detectors comprising:

an error signal output line;

first and second signal input lines for each of said detectors;

pulse-generating and time delay means associated with each of said detectors being effective when actuated to generate first and second signal pulses in timed sequence in the corresponding first and second signal input lines respectively;

a pair of control gates connecting said first signal input lines to said output line;

a settable and resettable binary gate connected between said second signal input lines and said control gates;

said binary gate being settable in response to a said second pulse generated by one of said detectors, and being resettable in response to a said second pulse generated by the other of said detectors;

said binary gate being effective when set to place the control gate for said one detector in a permissive state and the control gate for said other detector in a blocked state, and further being effective when reset to reverse said permissive/blocked states.

* * * * *

PO-1050
(5/69)

UNITED STATES PATENT OFFICE
CERTIFICATE OF CORRECTION

Patent No.     No. 3,646,510     Dated February 29, 1972

Inventor(s)    Donald J. Bailey

It is certified that error appears in the above-identified patent and that said Letters Patent are hereby corrected as shown below:

In the abstract, line 2, change "trail" to --train--.
Col. 3, line 19, change "649" to --648--.
Col. 4, lines 15-39, cancel the entire description beginning "of Fig. 4, namely" and ending "actuation of detector A would not."

Signed and sealed this 8th day of August 1972.

(SEAL)
Attest:

EDWARD M. FLETCHER, JR.      ROBERT GOTTSCHALK
Attesting Officer           Commissioner of Patents